United States Patent
Estrada et al.

(10) Patent No.: US 6,867,160 B1
(45) Date of Patent: Mar. 15, 2005

(54) HIGH ACTIVITY CATALYST FOR HIGH MOLECULAR WEIGHT POLYOLEFINS

(75) Inventors: Jesus Vela Estrada, Calgary (CA); Vaclav George Zboril, Calgary (CA)

(73) Assignee: Nova Chemicals (International) S.A. (CH)

( * ) Notice: Subject to any disclaimer, the term of this patent is extended or adjusted under 35 U.S.C. 154(b) by 806 days.

(21) Appl. No.: 09/703,545

(22) Filed: Nov. 1, 2000

(51) Int. Cl.[7] ............................. B01J 37/02; B01J 31/02
(52) U.S. Cl. ................. 502/103; 502/115; 502/128; 502/132; 502/119; 502/108; 526/124.1; 526/124.2; 526/124.3; 526/123.1; 526/348
(58) Field of Search ........................... 526/124.1, 124.2, 526/124.3, 123.1, 348; 502/103, 115, 118

(56) References Cited

U.S. PATENT DOCUMENTS 5,492,876 A    2/1996  Gillis et al. ................. 502/113
5,589,555 A  * 12/1996  Zboril et al. ................. 526/64

FOREIGN PATENT DOCUMENTS

| CA | 660869 | 4/1963 |
|----|--------|--------|
| CA | 703704 | 2/1965 |

* cited by examiner

*Primary Examiner*—Ling-Sui Choi
(74) *Attorney, Agent, or Firm*—Kenneth H. Johnson

(57) ABSTRACT

By controlling the hold up times and temperatures for mixing the components of aluminum, titanium and magnesium based catalyst for solution polymerization it is possible to prepare a catalyst having a high activity, which prepares high molecular weight polyolefins. Generally, catalyst loses activity and produces lower molecular weight polymer at higher temperatures. The catalyst of the present invention permits comparable polymers to be produced at higher reaction temperatures.

18 Claims, No Drawings

HIGH ACTIVITY CATALYST FOR HIGH MOLECULAR WEIGHT POLYOLEFINS

FIELD OF THE INVENTION

The present invention relates to a process for preparing a catalyst for a process for using the catalyst in a solution polymerization process and for the preparation of polymers of ethylene, especially homopolymers of ethylene and copolymers of ethylene and higher alpha-olefins. In particular, the invention relates to a method of sequentially reacting the components used to make the catalyst using specific holding times and temperature conditions to control the activity of the catalyst and the molecular weight of the polymers prepared.

BACKGROUND OF THE INVENTION

Polymers of ethylene, for example, homopolymers of ethylene and copolymers of ethylene and higher alpha-olefins, are used in large volumes for a wide variety of end-uses, for example, in the form of film, fibers, molded or thermoformed articles, pipe, pipe coating and the like. There are two types of processes for the manufacture of polyethylene that involve the polymerization of monomers in an inert liquid medium in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent 660,869 of A. W. Anderson, E. L. Fallwell and J. M. Bruce, which issued Apr. 9, 1963. In a solution process, the process is operated so that both the monomers and polymer are soluble in the reaction medium.

U.S. Pat. No. 5,589,555 issued Dec. 31, 1996 to Zboril et al. describes a process for controlling a solution polymerization process by controlling the composition of the aluminum alkoxy alkyl used in activating the catalyst. The catalyst is prepared reacting a mixture of a dialkyl magnesium compound and a first aluminum compound with a reactive halide and titanium tetrachloride and optionally a vanadium oxytrihalide to make a first component. The resulting mixture is then reacted with a mixture of a second aluminum alkyl compound. The patent does not teach or suggest heating of the reaction product of the first three components to elevated temperatures from 120° C. to 180° C. before adding a second aluminum component.

The specification teaches at column 2 lines 54 through 64 that, optionally the first component may be prepared by reacting (i) the first aluminum alkyl compound, and (ii) the titanium tetrachloride containing optionally vanadium oxytrihalide at temperature of less than 30° C. and heating the resultant admixture to at temperature of 150–300° C. for a period of 5 seconds to 60 minutes before adding (iii) second aluminum alkyl. No magnesium compound is used in this option.

U.S. Pat. No. 5,492,876 issued Feb. 20, 1996 to Gillis et al. teaches a process to prepare a catalyst comprising mixing in an inert organic solvent, aluminum compound of the formula $AlR_nX_{3-n}$ where R is a $C_{1-20}$ alkyl, cycloalkyl and aryl radical, X is a halogen and n is 1, 2 or 3; with titanium tetrahalide and vanadium oxytrihalide and heating the resulting solution to a temperature from 180° C. to 250° C. for a time from 15 seconds to 5 minutes and cooling the resulting solution to a temperature of less than 100° C. and adding second vanadium oxytrihalide compound to the cooled mixture and then activating the mixture with an additional aluminum compound, preferably an aluminoxane. The present invention does not contemplate the addition of a vanadium oxytrihalide nor does it contemplate the cooling step. Additionally the reference does not teach the presence of a magnesium compound.

Typically in the solution polymerization of ethylene catalyst tends to produce lower molecular weight polymer (which is indicated by a higher melt index) and lose activity at high temperatures. Also in producing ethylene copolymers it is desirable to have more and more uniformly distributed co-monomer incorporation which is reflected by a lower density. It is desirable to find a catalyst having a high activity without significantly reducing the molecular weight of the polymer. The present invention seeks to provide such a catalyst.

SUMMARY OF THE INVENTION

The present invention provides a process for preparing an olefin polymerization catalyst comprising sequentially mixing:

(i) a mixture of a compound of the formula $(R^1)_2Mg$ where in $R^1$ is selected from the group consisting of $C_{1-6}$ alkyl radicals and a compound of the formula $Al^1(R^2)_3$ wherein $R^2$ is selected from the group consisting of $C_{1-6}$ alkyl radicals; with (ii) HCl or a reactive organic chloride for example but not limited to $R^3Cl$ wherein $R^3$ is selected from the group consisting of $C_{1-6}$ alkyl radicals and $C_{6-12}$ aromatic radicals; and maintaining the resulting mixture at a temperature from 25° C. to 80° C., preferably 30 to 40° C. for a period from 5 seconds to 1 minute, preferably 10 to 40 seconds; then (iii) rapidly adding a titanium compound of the formula $(R^4)_aTiCl_{b-a}$ wherein $R^4$ is a $C_{1-6}$ alkoxy radical and a and b are integers from 0 to 4 and the sum of a+b is 4. The amount added is such as to provide an atomic ratio of $Mg:Al^1$ from 3:1 to 8:1; an atomic ratio of Cl:Mg from 1.5:1 to 2.5:1; atomic ratio of $Al^1$:Ti from 0.5:1 to 1.5:1; and an atomic ratio of Mg:Ti from 3:1 to 8:1; and in less than 20 seconds heating the resulting mixture to a temperature from 120° C. to 180° C.; or heating one or more of the resulting mixture of step (ii) (HCl or organic chloride, $(R^1)_2Mg$ and $Al^1(R^2)_3$) and the solution of the titanium compound of the formula $(R^4)_aTiCl_{b-a}$ or both to a temperature sufficient so that upon mixing a temperature from 120° C. to 180° C. is reached in less than 20 seconds; then the hot mixture is combined with (iv) a compound of the formula $(R^5)_2Al^2(R^6)$ wherein $R^5$ is a $C_{1-6}$ alkyl radical and $R^6$ is a $C_{1-6}$ alkoxy radical to provide a molar ratio of $Al^2$ to Ti from 0.5:1 to 1.5:1.

The present invention also provides a process for the solution polymerization of from 80 to 100% of ethylene with from 0 to 20 weight % of one or more $C_{3-8}$ alpha-olefins at a temperature from 105° C. to 200° C. but not limited to, in the presence of a catalyst prepared as described above.

BEST MODE

The present invention is directed to a process for the preparation of high molecular weight polymers of alpha-olefins, such polymers being intended for fabrication into articles by extrusion, injection molding, thermoforming, rotational molding and the like. In particular, the polymers of alpha-olefins are homopolymers of ethylene and copolymers of ethylene and higher alpha-olefins i.e. alpha-olefins especially such higher alpha-olefins having 3 to 12 carbon atoms (i.e. $C_{3-12}$ alpha-olefins), preferably having from 3 to 8 carbon atoms, examples of which are 1-butene, 1-hexene and 1-octene. The preferred higher alpha-olefins have 4–10 carbon atoms. Optionally, cyclic endomethylenic dienes may be copolymerized with the ethylene and $C_{3-12}$ alpha-olefins. Such polymers are known.

In the polymerization process using the catalyst of the present invention, inert hydrocarbon solvent, and optionally hydrogen for control of the polymer molecular weight, are fed to a reactor system together with monomers dissolved in the solvent. The monomer may be ethylene or mixtures of ethylene and at least one $C_{3-12}$ higher alpha-olefin, preferably ethylene or mixtures of ethylene and at least one $C_{4-10}$ higher alpha-olefin.

In accordance with the present invention the catalyst is prepared by using the sequence of addition and the heating and holding conditions described above.

In the process of the present invention in step (i) the components are a mixture of a dialkyl magnesium compound and a trialkyl aluminum compound.

In the process for preparing the catalyst of the present invention the component in step (ii) is preferably an organic halide, most preferably a chloride.

In the process for preparing the catalysts of the present invention alkyl substituents $R^1$, $R^2$, $R^3$ and $R^5$ are preferably selected from the group consisting of $C_{1-4}$ alkyl radical radicals. Such radicals include methyl, ethyl, propyl and primary, secondary and t-butyl radicals. Preferably each $R^1$ is independently selected from the group consisting of ethyl and butyl, most preferably butyl radicals. Preferably $R^2$ are methyl radicals. Preferably $R^3$ is a t-butyl radical. Preferably $R^5$ is an ethyl radical.

In the process for preparing the catalysts of the present invention alkyl substituent $R^3$ is preferably selected from the group consisting of $C_{1-4}$ alkyl radical radicals and a benzyl radical. Such radicals include methyl, ethyl, propyl and primary, secondary and t-butyl radicals. Preferably $R^3$ is a t-butyl radical.

In the process of the present invention $R^4$ of the titanium compound used in step (iii) and $R^6$ of the aluminum compound used in step (iv) are preferably selected from the group consisting of $C_{1-4}$ alkoxy radicals. Such radicals include methoxy, ethoxy, propoxy and butoxy radicals. Most preferably $R^6$ is an ethoxy radical.

In the process for preparing the catalyst of the present invention in the titanium compound used in step (iii) a is preferably 0 and the compound is a titanium tetrahalide, most preferably titanium tetrachloride (i.e. $TiCl_4$).

In a preferred embodiment of the present invention, in step (ii) the hold up time before adding the titanium compound is preferably from 5 seconds to 1 minute, most preferably from 10 to 40 seconds. The mixture of components (i) and (ii) are held at a temperature from 30° C. to 40° C. during the hold up time.

Preferably in step (iii) of the present invention the temperature is from 120° C. to 180° C., most preferably from 130° C. to 160° C. In step (iii) the hold up time and the temperature may be controlled by in-line mixing of the components up to step (ii) and the component from step (iii) by feeding the component for step (iii) to an inline mixer (e.g. tube or pipe which may optionally contain a static mixer or may be operated under conditions of turbulent flow) at a point using a flow rate to get the desired hold up time. The hold up time may be less than 20 seconds, preferably less than 10 seconds. The in-line mixer may be heat jacketed to reach a final exit temperature from the mixer into a continuous stirred tank reactor. A solution of one or more monomers, optionally the component used in step (iv) and optionally hydrogen are fed into the reactor separately. The final exit temperature of the catalyst stream from the in-line mixer is achieved by:

a) heating one or more of the mixture of step (ii) and solution of the titanium compound or both to a temperature sufficient so that upon mixing said temperature is obtained within 20 seconds; or b) mixing the mixture of step (ii) and the solution of the titanium compound or both either or both of said solutions may optionally be heated to a temperature insufficient so that upon mixing said temperature is not obtained and heating the resulting mixture at a rate to obtain said temperature within 20 seconds.

If process a) is followed either or both of the mixture of step (ii) and the solution of the titanium compound may be heated to temperatures from 120° C. to 300° C. While the final temperature the mixture is a function of relative masses and temperatures of each individual solution generally if only one solution is heated the temperature is typically from 220° C. to 300° C. The concept of heat balance is well known in the chemical industry and one skilled in the art should be able to select appropriate temperatures based on the relative masses being mixed and the temperatures being mixed.

If process b) is used the resulting mixture is not at the correct temperature and it is heated by any suitable means. One means of heating the resulting solution is to use a heat exchanger such as a heating jacket about an in-line mixer (e.g. a segment of pipe or tube, optionally containing a static mixer and having a heating jacket through which a heat transfer medium flows at a sufficient temperature and rate to heat the resulting solution to the required temperature within the required time).

If process a) is used similar devices may be used to heat either or both component streams.

In a preferred embodiment of the present invention the molar ratio of $Mg:Al^1$ is from 4:1 to 6:1; the molar ratio of Cl:Mg is from 1.8:1 to 2.2:1; the molar ratio of $Al^1:Ti$ is from 0.5:1 to 1.5:1, most preferably 0.8:1 to 1.3:1; the molar ratio of Mg:Ti is from 4:1 to 6:1; and the molar ratio of $Al^2:Ti$ is from 0.5:1 to 1.5:1, most preferably from 1:1 to 1.5:1.

The process for preparing the catalyst may be conducted in a tubular reactor or in a series of continuous stirred tank reactors (CSTR). The output from the tubular reactor or the last CSTR feeds into the polymerization reactor.

The concentration of the components of the solutions used in the preparation of the catalyst is not critical and is primarily governed by practical considerations. Concentrations of as low as 25 ppm, on a weight basis, may be used but higher concentrations, for example 100 ppm and above, such as from 150 to 250 ppm, are preferred.

As exemplified hereinafter, the sequence of steps in the preparation of the catalyst is important in obtaining a catalyst with high activity. The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The catalyst described herein is used in the process of the present invention without separation of any of the components of the catalyst. In particular, neither liquid nor solid fractions are separated from the catalyst before it is fed to the reactor. In addition, the catalyst components are not slurries. All the components are easy-to-handle, storage stable liquids.

The catalyst described herein may be used according to the process of the present invention, over the wide range of temperatures that may be used in an alpha-olefin polymerization process operated under solution conditions. For example such polymerization temperatures may be in but not limited to the range of 105° C. to 200° C. and especially in the range of 130° C. to 180° C. The polymerization process may be conducted in a reactor system such as in a tubular reactor or multi-reactor system.

The pressures used in the process of the present invention are those known for solution polymerization processes, for example, pressures in the range of about 4–20 MPa.

In the polymerization process of the present invention, the alpha-olefin monomers are polymerized in the reactor in the presence of the catalyst. Pressure and temperature are controlled so that the polymer formed remains in solution.

Optionally, small amounts of hydrogen, for example 1–40 parts per million by weight, based on the total solution fed to the reactor may be added to one or more of the feed streams of the reactor system in order to improve control of the melt index and/or molecular weight distribution and thus aid in the production of a more desirable product, as is disclosed in Canadian Patent 703,704.

The solution passing from the polymerization reactor is normally treated to deactivate any catalyst remaining in the solution. A variety of catalyst deactivators are known, examples of which include but not limited to fatty acids, alkaline earth metal salts of aliphatic carboxylic acids and alcohols. The hydrocarbon solvent used for the deactivator is preferably the same as the solvent used in the polymerization process. If a different solvent is used, it must be compatible with the solvent used in the polymerization mixture and not cause adverse effects on the solvent recovery system associated with the polymerization process.

After deactivation of the catalyst, the solution containing polymer may be passed through a bed of activated alumina or bauxite, which removes part, or all of the deactivated catalyst residues. In a preferred embodiment the polymerization is conducted without removal of deactivated catalyst residues. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer color. The treatment may be carried out for about 1 to 16 hours, following which the polymer may be dried and cooled with a stream of air for 1 to 4 hours.

Pigments, antioxidants, UV screeners, hindered amine light stabilizers and other additives may be added to the polymer either before or after the polymer is initially formed into pellets or other comminuted shapes. The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range of 0.1:1 to 5:1 with the total amount of antioxidant being in the range of 200 to 3000 ppm.

The polymerization process of the present invention may be used to prepare homopolymers of ethylene and copolymers of ethylene and higher alpha-olefins having densities in the range of, for example, about 0.900–0.970 g/cm$^3$ and especially 0.910–0.930 g/cm$^3$. Such polymers may have a melt index, as measured by the method of ASTM D-1238, condition E, in the range of, for example, about 0.1–200, and especially in the range of about 30–45 dg/min. Such a melt index tends to indicate a higher molecular weight of the resulting polymer. The polymers may be manufactured with narrow or broad molecular weight distribution. For example, the polymers may have a stress exponent, a measure of molecular weight distribution, in the range of about 1.1–2.5 and especially in the range of about 1.3–2.0. The process of the invention is believed to be particularly useful in the manufacture of broad molecular distribution polymers.

Stress exponent is determined by measuring the throughput of a melt indexer at two stresses (2160 g and 6480 g loading) using the procedures of the ASTM melt index test method, and the following formula:

Stress exponent=1/0.477×log (wt. of polymer extruded with 6480 g wt.)/(wt. of polymer extruded with 2160 g wt.)

Stress exponent values of less than about 1.40 indicate narrow molecular weight distribution while values above about 1.70 indicate broad molecular weight distribution.

The polymers prepared using the catalyst of the present invention tend to have a higher molecular weight than those prepared using the catalysts of the prior art using comparable polymerization conditions. In the alternative the catalyst of the present invention may be used at higher polymerization temperatures to produce polymers having comparable molecular weights to those produce using prior art catalyst.

The catalysts of the present invention have improved activity over prior Mg/Al/Ti catalysts and particularly those used in solution process at temperatures between but not limited to 105° C. and 200° C. In a CSTR the catalyst activity is defined as:

$$(KP)/(HUT)=(Q/(1-Q))(1/\text{Catalyst concentration})$$

Wherein Q is the fraction of ethylene monomer converted; HUT is a reciprocal space velocity (hold up time) in the polymerization reactor expressed in minutes and maintained constant throughout the experimental program; and the catalyst concentration is the concentration in the polymerization reactor expressed in mmol of Ti/L.

The polymers produced by the process of the present invention are capable of being fabricated into a wide variety of articles, as is known for homopolymers of ethylene and copolymers of ethylene and higher alpha-olefins.

The process of the present invention is believed to be particularly advantageous in the preparation of broad molecular weight distribution polymers using an adiabatic tubular reactor, or a series of reactors.

EXAMPLES

The present invention will be illustrated by the following non-limiting examples in which unless otherwise indicated weight is in grams and part is parts by weight. The ratios for catalyst components are atomic ratios and the concentrations are in mmol/L.

Reactor Set Up

The polymerization reactor was a solution reactor, which is a 81 mL free-volume (regular internal shape, with the approximate dimensions of 15×90 mm) pressure vessel fitted with six regularly spaced internal baffles. The vessel was fitted with a six-blade turbine-type impeller, a heating jacket, pressure and temperature controllers, three feed lines and a single outlet. The feed lines were located on the top of the vessel, each at a radial distance of 40 mm from the axis, while the outlet line was axial with the agitator shaft. The catalyst components and the monomers were dissolved or dispersed in cyclohexane, which had been purified by being passed through beds of activated alumina, molecular sieves and silica gel prior to being stripped with nitrogen.

In the following experiments the catalyst was prepared in an in-line mixer feeding into the stirred tank polymerization reactor described above. The in-line mixer comprised a tube with heating jackets and a number of inlets. The temperature and mixing time of the reactants fed to the inline mixer could be controlled. The hold up time in the stirred tank polymerization reactor was short and the solution of product was continuously withdrawn from the reactor and the resulting polyethylene co- or homopolymer was recovered and analyzed.

The catalyst flow rates were controlled to provide milimolar ratios of the components as specified below. The catalyst comprised the following components. The first component was a mixture of butyl ethyl magnesium (BEM) and triethyl aluminum (TEAL) in molar ratios set out in the tables below. The first component was mixed in line with the second component, t-butyl chloride (Cl), to provide the molar ratios set out below. The hold up time (in seconds) for mixing the first and second component (HUT1) was controlled and the mixing temperature (T1) in degrees Celsius was also controlled. The third component added to the catalyst was $TiCl_4$ (Ti). The hold up time (in seconds) for mixing the first, second and third component (HUT2) was controlled and the mixing temperature (T2) in degrees Celsius was also controlled. The fourth component added to the catalyst was diethyl aluminum ethoxide (DEALOET). The fourth catalyst component was added in line only for the control experiments; the hold up time in seconds (HUT3) and the temperature in degrees Celsius (T3) was controlled. For all of the other experiments the fourth catalyst component was added directly to the reactor. The polymerization reactor was maintained at a temperature from 195° C. to 200° C. for the experiments. The monomer(s) were dissolved in the solvent at about 3 weight % and if 1-octene co-monomer was used it was present in about an equal weight percent as the ethylene.

The resulting polymers were tested for a number of properties. The density of the polymers was determined using ASTM D-792. The melt index was measured by the method of ASTM D-1238, condition E. Stress exponent (S.Ex) is measured as described above.

The conversion of the reaction was determined and the activity of the catalyst was also determined in some instances. The conversion was calculated from the ethylene flow fed to the reactor and from the unreacted ethylene (measured with a Gas Chromatograph) present in the polymer solution that was continuously withdrawn from the reactor.

Control Experiment

For the control experiments the molar ratios of catalyst components, hold up times and temperatures were as follows. BEM 5 mmol; TEAL 1 mmol; Cl 10 mmol; HUT1—60 seconds; T1 30° C.–35° C.; Ti 1.0 mmol; HUT2—40 seconds; T2 30° C.–35° C.; DEALOET 2 mmol; HUT3—3.6 seconds; and T3 30° C.–35° C. No hydrogen was added to the reactor.

Experiment 1

Polyethylene homopolymer was prepared. The catalyst composition and hold up times and temperatures were as follows: BEM 5 mmol; TEAL 1 mmol; Cl 10 mmol; HUT1—variable seconds; T1 30° C.–35° C.; Ti 1.0 mmol; HUT2—5 seconds; T2—150° C.; DEALOET 2 mmol.

For different first hold up times (HUT1) in seconds the activity of the catalyst was determined using the formula set out above. The results are set forth in Table 1.

TABLE 1

| HUT1 (seconds) | Catalyst Activity (KP*HUT), [L/mmol] |
|---|---|
| 10 | 672 |
| 20 | 745 |
| 40 | 643 |
| 60 | 477 |
| Control | 478 |

By reducing the first hold up time (HUT1) and using the mixing times and temperatures of the present invention, activity of the catalyst increases.

Experiment 2

Ethylene octene copolymer was prepared. The catalyst composition and hold up times and temperatures were as follows: BEM 5 mmol; TEAL 1 mmol; Cl 10 mmol; HUT1—40 seconds; T1 30° C.–35° C.; Ti 1.0 mmol; HUT2—10 seconds; T2—variable ° C.; DEALOET 2 mmol. No hydrogen was added to the reactor.

The resulting polymer was recovered and its melt index (MI), stress exponent (S.Ex), and density were determined. The results are set forth in Table 2.

TABLE 2

| T2 [° C.] | MI [dg/min] | S. Ex | Density [g/cc] |
|---|---|---|---|
| 150 | 33 | 1.34 | 0.9119 |
| 130 | 37 | 1.37 | 0.9134 |
| 120 | 73 | 1.37 | 0.9125 |
| <40 | 71 | 1.39 | 0.9101 |
| Control | 58 | 1.40 | 0.9182 |

The conversion for the reaction was from 93–94%.

Decreasing MI shows increasing molecular weight in the polymer. The lower density at 150° C. shows better co-monomer distribution and incorporation.

Experiment 3

Experiment 2 was repeated except that ethylene homopolymer was made. Additionally, catalyst activity was measured instead of density. The results are set forth in Table 3.

TABLE 3

| T2 [° C.] | MI [dg/min] | S. Ex | Activity [L/mmol] |
|---|---|---|---|
| 150 | 4.40 | 1.34 | 933 |
| 130 | 4.73 | 1.34 | 789 |
| 120 | 6.87 | 1.37 | 701 |
| <40 | 5.77 | 1.42 | 634 |
| Control | 5.60 | 1.52 | 403 |

Again decreasing MI show increasing molecular weight. In this experiment it is clear that higher molecular weight product is being produced with a higher activity catalyst which would not have been expected. The conversion for the reaction was from 93–94%.

What is claimed is:

1. A process for preparing an olefin polymerization catalyst comprising sequentially mixing:
   (i) a solution of a mixture of a compound of the formula $(R^1)_2Mg$ wherein $R^1$ is selected from the group consisting of $C_{1-6}$ alkyl radicals and a compound of the formula $Al^1(R^2)_3$ wherein $R^2$ is selected from the group consisting of $C_{1-6}$ alkyl radicals; with
   (ii) a solution of HCl or an organic chloride of the formula $R^3Cl$ wherein $R^3$ is selected from the group consisting of $C_{1-6}$ alkyl radicals and $C_{6-12}$ aromatic radicals; and maintaining the resulting mixture at a temperature from 30° C. to 40° C. for a period from 10 to 40 seconds; then
   (iii) rapidly adding a solution of a titanium compound of the formula $(R^4)_aTiCl_{b-a}$ wherein $R^4$ is a $C_{1-6}$ alkoxy radical and a and b are 0 or integers from 1 to 4 and the sum of a+b is 4 to provide a molar ratio of $Mg:Al^1$ from 3:1 to 8:1; a molar ratio of Cl:Mg from 1.5:1 to 2.5:1; molar ratio of $Al^1$:Ti from 0.5:1 to 1.5:1; and a molar ratio of Mg:Ti from 3:1 to 8:1 and in less than 20 seconds bringing temperature of the resulting mixture to from 130° C. to 160° C. by any of:
   a) heating one of the mixture of component (ii) and the solution of the titanium compound or both to a temperature sufficient so that upon mixing said temperature is obtained within 20 seconds; or b) heating one of the mixture of step (ii) and the solution of titanium compound or both to a temperature insufficient so that upon mixing said temperature is not obtained and heating the resulting mixture at a rate to obtain said temperature within 20 seconds; and combining the resulting hot mixture with (iv) a compound of the formula $(R^5)_2Al^2(R^6)$ wherein $R^5$ is a $C_{1-6}$ alkyl radical and $R^6$ is a $C_{1-6}$ alkoxy radical to provide a molar ratio of $Al^2$ to Ti from 0.5:1 to 1.5:1.

2. The process according to claim 1, wherein step (iii) (a) is used.

3. A process according to claim 2, wherein in step (ii) the halide is an organic halide.

4. The process according to claim 3, wherein $R^1$, $R^2$ and $R^3$ are selected from the group consisting of $C_{1-4}$ alkyl radicals.

5. The process according to claim 4, wherein $R^5$ is selected from the group consisting of $C_{1-4}$ alkyl radicals and $R^4$ and $R^6$ are selected from the group consisting of $C_{1-4}$ alkoxy radicals.

6. The process according to claim 5, wherein in step (iii) the temperature the mixture of component (i), (ii) and (iii) is from 130° C. to 160° C.

7. The process according to claim 6, wherein in step (iii) the hold up time of the mixture of component (i), (ii) and (iii) is less than 10 seconds.

8. The process according to claim 7, wherein a is 0.

9. The process according to claim 8, wherein $R^1$ is selected from the group consisting of ethyl and butyl radicals.

10. The process according to claim 9, wherein in step (ii) the halide is t-butyl halide.

11. The process according to claim 10, wherein all $R^2$ radicals are methyl radical.

12. The process according to claim 11, wherein $R^5$ is an ethyl radical and $R^6$ is an ethoxide radical.

13. The process according to claim 12, wherein the molar ratio of $Mg:Al^1$ is from 4:1 to 6:1.

14. The process according to claim 13, wherein the molar ratio of Cl:Mg is from 1.8:1 to 2.2:1.

15. The process according to claim 14, wherein the molar ratio of $Al^1:Ti$ is from 0.8:1 to 1.5:1.

16. The process according to claim 15, wherein the molar ratio of Mg:Ti is from 4:1 to 6:1.

17. The process according to claim 16, wherein the molar ratio of $Al^2$ to Ti is from 1:1 to 1:1.5.

18. The process according to claim 1, wherein step (iii) (a) is used.

* * * * *